US006843933B2

United States Patent
Schelhaas et al.

(10) Patent No.: US 6,843,933 B2
(45) Date of Patent: *Jan. 18, 2005

(54) BLOCKED POLYISOCYANATES

(75) Inventors: Michael Schelhaas, Köln (DE); Christoph Gürtler, Köln (DE); Beate Baumbach, Burscheid (DE); Christian Füssel, Tönisvorst (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/458,040

(22) Filed: Jun. 10, 2003

(65) Prior Publication Data

US 2004/0030086 A1 Feb. 12, 2004

(30) Foreign Application Priority Data

Jun. 17, 2002 (DE) .......................................... 102 26 926

(51) Int. Cl.$^7$ ............................................. C07C 26/500
(52) U.S. Cl. ..................... 252/182.2; 528/45; 560/25; 428/423.1; 428/425.8
(58) Field of Search .................. 528/45; 252/182.2; 560/25; 428/423.1, 425.8

(56) References Cited

U.S. PATENT DOCUMENTS 5,071,937 A    12/1991  Potter et al. .................. 528/45

OTHER PUBLICATIONS

Houben Weyl, Methoden der organschen Chemie, XIV/2, date unavailable pp. 61–70, E. Müller, "Polyurethane".

Progress in Organic Coatings, 3, month unavailable 1975, pp. 73–99, "Blocked Isocyanates" by Z. W. Wicks, Jr.

Progress in Organic Coatings, 9, month unavailable 1981, pp. 3–28, "New Developments In The Field Of Blocked Isocyanates" by Z. W. Wicks, Jr.

Progress in Organic Coatings, 36, month unavailable 1999, pp. 148–172, "Blocked isocyanates III: Part A. Mechanisms and chemistry" by D. A. Wicks and Z. W. Wicks, Jr.

Farbe & Lack, C. R. Vincentz Verlag, Hannover, 97, month unavailable 1996, "One–pack baking urethane systems with low thermal yellowing and low curing temperature" by Dr. T. Engbert, Dr. E. König and Dr. E. Jürgens.

*Primary Examiner*—James J. Seidleck
*Assistant Examiner*—Melanie Bissett
(74) *Attorney, Agent, or Firm*—Joseph C. Gil; Gary F. Matz

(57) ABSTRACT

Blocked polyisocyanates, their preparation and use in one-component coating materials. In organic polyisocyanates having at least two isocyanate groups, the isocyanate groups are blocked with OH acidic cyclic ketones of the general formula (I). The blocked polyisocyanate system of the invention reacts without elimination of the blocking agent and possesses low crosslinking temperatures.

11 Claims, No Drawings

BLOCKED POLYISOCYANATES

CROSS REFERENCE TO RELATED PATENT APPLICATION

The present patent application claims the right of priority under 35 U.S.C. §119 (a)–(d) of German Patent Applications No. 10226927.0, 10226931.9, 10226926.2, 10226925.4, and 10226924.6, all filed Jun. 17, 2002.

BACKGROUND OF THE INVENTION

1. Field of the Invention

The invention relates to blocked polyisocyanates, their preparation and use in one-component coating materials.

2. Description of the Related Art

The blocking of polyisocyanates for the temporary protection of the isocyanate groups is a known working method and is described in, for example, Houben Weyl, Methoden der organischen Chemie XIV/2, pp. 61–70. Curable compositions comprising blocked polyisocyanates find use in, for example, polyurethane (PU) coating materials.

The preparation of one-component, storage-stable binders for PU baking varnishes by blending blocked polyisocyanates with OH-containing polycondensates or addition polymers (polyesters or polyacrylates) is known.

In these one-component coating materials the blocking agent fulfils two functions: firstly, it prevents premature reaction of the OH component with the NCO groups it blocks, and secondly, by virtue of its specific deblocking attributes, it regulates the curing of the coating materials in a defined temperature range. As well as these desired properties, however, the individual blocking agents also bring with them unwanted properties, such as crystallization or yellowing tendency, deficient economics, environmental problems and critical physiological effects, for example.

This can be illustrated using butanone oxime and 3,5-dimethylpyrazole as examples. Both blocking agents are readily compatible with the known paint polyisocyanates and deblock within about 30 minutes at 130–140° C. On the minus side, butanone oxime leads to thermal yellowing of the baked coating, and the substance per se is toxicologically objectionable. Dimethylpyrazole is relatively expensive to prepare from acetylacetone and hydrazine hydrate, and gives coatings an unpleasant odour (see, for example, T. Engbert, E. König, E. Jürgens, Farbe & Lack, Curt R. Vincentz Verlag, Hanover 97/1996).

The elimination of the blocking agent and its gaseous state from the coating film may lead, furthermore, to blistering in the coating. Incineration of the emitted blocking agent may be necessary where appropriate. An overview of blocking agents suitable in principle is found, for example, in Wicks et al. in Progress in Organic Coatings 1975, 3, 73–79, 1981, 9, pp. 3–28 and 1999, 36, pp. 148–172.

For the coil coatings field, the blocked polyisocyanates must be crosslinkable within a very short time at baking temperatures of up to 254° C. PMT (peak metal temperature) and during the baking operation the polymers must exhibit very little thermal yellowing, preferably none. The baking temperature required is dependent primarily on the reactivity of the blocked polyisocyanate and/or on the catalyst used for this process.

BRIEF SUMMARY OF THE INVENTION

The present invention is therefore based on the object of providing novel blocked polyisocyanate systems which react without elimination of the blocking agent, i.e. emissions-free, and possess low crosslinking temperatures, in other words a high reactivity. Moreover, these blocked polyisocyanate systems should be stable on storage at ambient temperature and should in particular in combination, inter alia, with suitable polyol components be suitable for the preparation of one-component coating materials, especially baking varnishes.

It has been possible to achieve this object with the polyisocyanates blocked in accordance with the invention and the binders obtainable on the basis of these polyisocyanates.

It has now been found that CH-acidic compounds having the structure of an activated cyclic ketone, preferably that of cyclopentanone 2-carboxy ester, are very suitable for the blocking of polyisocyanates to give coatings with a low yellowing tendency without unwanted elimination of volatile substances.

The invention accordingly provides polyisocyanates blocked with activated cyclic ketones, processes for preparing them, and one-component (1 K) coating materials obtainable on the basis thereof, especially baking varnishes, which are characterized in that blocked polyisocyanates of the invention are used as crosslinker component for organic polyhydroxyl compounds.

DETAILED DESCRIPTION OF THE INVENTION

The present invention provides for the addition of organic polyisocyanates to a formulation to produce PU coating materials. These coating materials may be one-component (1K) PU baking varnishes. These coating materials may be used for coating coils, and may be applied to the coils by methods known to those in the art.

As used herein, unless otherwise expressly specified, all of the numerical ranges, amounts, values and percentages such as those for amounts of materials, times and temperatures of reaction, ratios of amounts, values for molecular weight, and others in the following portion of the specification may be read as if prefaced by the word "about" even though the term "about" may not expressly appear with the value, amount or range.

For the process of the invention, organic polyisocyanates having at least two isocyanate groups are used. In these organic polyisocyanates, isocyanate groups are blocked with CH-acidic cyclic ketones of the general formula (I)

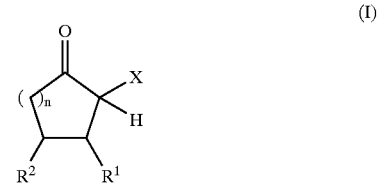

(I)

in which

X represents an electron-withdrawing group, $R^1$ and $R^2$ independently of one another represent the radicals H, $C_1$–$C_{20}$-(cyclo)alkyl, $C_6$–$C_{24}$-aryl, $C_1$–$C_{20}$-(cyclo)alkyl ester or $C_1$–$C_{20}$-(cyclo)alkyl amide, $C_6$–$C_{24}$-aryl ester or $C_6$–$C_{24}$-aryl amide, mixed aliphatic/aromatic radicals having 1 to 24 carbon atoms, wherein $R^1$ and $R^2$ may also be part of a 4 to 8-membered ring, and n is an integer from 0 to 5.

These polyisocyanates have an overall blocked isocyanate group content (calculated as NCO) of from 0.1 to 25% by weight. They have already been described in the earlier application by the same applicant, DE-A 10 132 016.

Preference is given to a blocked isocyanate group content (calculated as NCO) of from 0.1 to 15.6% by weight based on the polyisocyanate. More preference is given to a blocked isocyanate group content (calculated as NCO) of from 0.1 to 14% by weight. Where appropriate, partial blocking of the polyisocyanate may be present; the isocyanate groups which are not blocked can then be used for further reactions. Typically, all of the isocyanate groups are blocked.

The electron-withdrawing group X may be any substituent which leads to CH-acidity of the α hydrogen. These may be, for example, ester groups, amide groups, sulfoxide groups, sulfone groups, nitro groups, phosphonate groups, nitrile groups, isonitrile groups, carbonyl groups or polyhaloalkyl groups and also halogens, especially fluorine and chlorine. Preference is given to nitrile groups and ester groups, the carboxylic methyl ester and carboxylic ethyl ester group being more preferred.

Also suitable are compounds of the general formula (I) whose ring comprise, where appropriate, heteroatoms, such as oxygen, sulphur, or nitrogen atoms.

The activated cyclic ketone of the formula (I) preferably has a ring size of 5 (n=1) or 6 (n=2).

Preferred compounds of the general formula (I) are cyclopentanone 2-carboxymethyl ester and 2-carboxyethyl ester, cyclopentanone-2-carbonitrile, cyclohexanone 2-carboxymethyl ester and 2-carboxyethyl ester or cyclopentanone-2-carbonylmethyl. Particular preference is given to cyclopentanone 2-carboxymethyl ester and 2-carboxyethyl ester and also cyclohexanone 2-carboxymethyl ester and 2-carboxyethyl ester. The cyclopentanone systems are readily obtainable from a technical standpoint by Dieckmann condensation of dimethyl adipate or diethyl adipate. Cyclohexanone 2-carboxymethyl ester can be prepared by hydrogenating methyl salicylate.

The polyisocyanate for blocking may be any organic polyisocyanate suitable for crosslinking compounds containing active hydrogen, i.e. aliphatic polyisocyanates, including the cycloaliphatics, aromatic and heterocyclic polyisocyanates having at least two isocyanate groups, and mixtures thereof.

Typical examples of polyisocyanates are aliphatic isocyanates such as di- or triisocyanates, e.g. butane diisocyanate (BDI), pentane diisocyanate, hexane diisocyanate (HDI), 4-isocyanatomethyl-1,8-octane diisocyanate (triisocyanatononane, TIN) or cyclic systems, such as 4,4'-methylenebis-(cyclohexyl isocyanate) (Desmodur® W, Bayer AG, Leverkusen), 3,5,5-trimethyl-1-isocyanato-3-isocyanatomethylcyclohexane (IPDI) and ω,ω'-diisocyanato-1,3-dimethylcyclohexane (H$_6$XDI). Examples of aromatic polyisocyanates are 1,5-naphthalene diisocyanate, diisocyanatodiphenylmethane (MDI) or monomeric MDI, diisocyanatomethylbenzene (TDI), especially the 2,4 and the 2,6 isomer and technical-grade mixtures of the two isomers, and 1,3-bis(isocyanatomethyl)benzene (XDI).

Likewise very suitable are polyisocyanates obtainable by reacting the di- or triiso-cyanates with themselves by way of isocyanate groups, such as uretdiones or carbodiimide compounds, or such as isocyanurates and iminooxadiazinediones, which are formed by reaction of three isocyanate groups. The polyisocyanates may likewise comprise monomeric di- and/or triisocyanates and/or oligomeric polyisocyanates containing biuret, allophanate and acylurea structural elements, low-monomer-content or proportionally modified monomeric di-, triisocyanates, and any desired mixtures of the polyisocyanates stated.

Likewise highly suitable are polyisocyanate prepolymers containing on average more than one isocyanate group per molecule. They are obtained by initially reacting a molar excess, of one of the abovementioned polyisocyanates, for example, with an organic material having at least two active hydrogen atoms per molecule, in the form of hydroxyl groups, for example.

Preferred polyisocyanates are those which contain a uretdione, isocyanurate, iminooxadiazinedione, acylurea, biuret or allophanate structure, for example those based on butane diisocyanate (BDI), pentane diisocyanate, hexane diisocyanate (HDI), 4-isocyanatomethyl-1,8-octane diisocyanate (triisocyanatononane, TIN) or cyclic systems, such as 4,4'-methylenebis(cyclohexyl isocyanate) (Desmodur® W, Bayer AG, Leverkusen), 3,5,5-trimethyl-1-isocyanato-3-isocyanatomethyl-cyclohexane (IPDI) and ω,ω'-diisocyanato-1,3-dimethylcyclohexane (H$_6$XDI). Preferred examples of aromatic polyisocyanates are 1,5-naphthalene diisocyanate, diisocyanatodiphenylmethane (MDI) or monomeric MDI, diisocyanatomethyl-benzene (TDI), especially the 2,4 and the 2,6 isomer and technical-grade mixtures of the two isomers, and 1,3-bis(isocyanatomethyl)benzene (XDI).

More preferred polyisocyanates are those based on hexane diisocyanate (HDI), 4,4'-methylenebis(cyclohexyl isocyanate) and on 3,5,5-trimethyl-1-isocyanato-3-isocyanatomethylcyclohexane (IPDI).

Described below is a process for preparing the organic polyisocyanates blocked in accordance with the invention, the process being characterized in that polyisocyanates are reacted with CH-acidic cyclic ketones of the general formula (I)

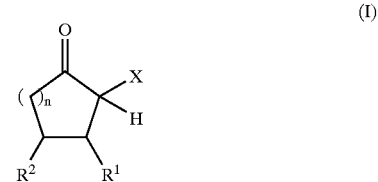

in which

X represents an electron-withdrawing group,

R$^1$ and R$^2$ independently of one another represent the radicals H, C$_1$–C$_{20}$-(cyclo)alkyl, C$_6$–C$_{24}$-aryl, C$_1$–C$_{20}$-(cyclo)alkyl ester or C$_1$–C$_{20}$-(cyclo)alkyl amide, C$_6$–C$_{24}$-aryl ester or C$_6$–C$_{24}$-aryl amide, mixed aliphatic/aromatic radicals having 1 to 24 carbon atoms, wherein R$^1$ and R$^2$ may also be part of a 4 to 8-membered ring, and n is an integer from 0 to 5, in the presence of a catalyst, using from 0.8 to 1.2 mol of the cyclic ketone of the formula (I) per isocyanate group equivalent of the polyisocyanates for blocking.

Preferably, one isocyanate group equivalent of the polyisocyanate component for blocking is reacted with 1 equivalent of blocking agent.

Suitable catalysts are alkali metal and alkaline earth metal bases, such as powdered sodium carbonate (soda) for example. Depending on the cyclic ketone used it is also possible to employ trisodium phosphate or amine bases such as DABCO (1,4-diazabicyclo[2.2.2]octane). Likewise suitable are the carbonates of the metals from the second transition group. Preference is given to using sodium carbonate or potassium carbonate. Alternatively, the reaction of the cyclic ketone with the isocyanate may be carried out in the presence of zinc salt catalysts. The reaction with zinc 2-ethylhexanoate is more preferred. Mixtures of catalysts can also be used.

In the process of the invention, based on the polyisocyanates used, from 0.05 to 10% by weight, preferably from 0.07 to 3% by weight, of the catalyst is added. It is more preferred to use from 0.1 to 1% by weight of the catalyst.

The reaction can be conducted at from 0° C. to 140° C. A temperature range of from 15° C. to 90° C. is preferred.

Blocking may take place without solvent or else in the presence of suitable solvents. Suitable solvents are the customary paint solvents, such as butyl acetate, methoxypropyl acetate or solvent naphtha, as is offered, for example, by the company Exxon-Chemie as an aromatics-containing solvent, and also mixtures of the said solvents. It is preferred to perform blocking in the said solvents, in which case the solids content to be set is generally between 10 and 90%.

In addition to the cyclic ketones of the general formula (I) used in accordance with the invention, mixtures of any desired blocking agents may also be used in the process of the invention in order to obtain the particular coating properties desired, with the fraction of compounds of the formula (I) being at least 30% by weight, preferably 50% by weight, with more preference 100% by weight.

The invention also provides a process for preparing one-component (1 K) baking varnishes characterized in that organic polyisocyanates of the invention are used as a crosslinker component for organic polyhydroxyl compounds.

A feature of the polyisocyanates blocked for use in accordance with the invention is that they cure in combination with a suitable organic polyhydroxyl compound and in the presence of suitable catalysts in baking times of not more than two minutes, preferably within from 5 up to a maximum of 60–80 seconds, with more preference within 5 up to a maximum of 35 sec. The oven temperature here is 300–400° C. Of course, the baking conditions depend on the material employed and also on the thickness of the metal coil for coating. The oven temperature is generally situated at a temperature of not less than 180° C. and not more than 260° C. PMT. A temperature range of from 210° C. to 245° C. PMT is preferred. A range from 216° C. to 241° C. PMT is more preferred. The technical properties of the baked coating film, such as resistance to MEK (methyl ethyl ketone) solvent, hardness and elasticity at a given baking temperature and given baking time are dependent, among other things, on the amount of the catalyst used. Baking takes place preferably over a period of 38 seconds at a temperature of 232° C. Temperatures of 216° C. are also possible. In the case of an aluminium substrate, this results in a baking time of 33 seconds. The specific optimum conditions are determined in a manner familiar to the person skilled in the art, by means of preliminary range-finding tests, and in application the temperatures in the coil coating oven are monitored using a sensitive strip.

Examples of suitable catalysts for the crosslinking are DBTL (dibutyltin dilaurate), titanium 2-ethylhexanoate, titanium tetraisopropoxide and other common titanium(IV) compounds, zirconium 2-ethylhexanoate and other common zirconium(IV) compounds, aluminium triethoxide, scandium trifluoromethane-sulphonate, yttrium 2-ethylhexanoate, yttrium trifluoromethanesulphonate, lanthanum 2-ethylhexanoate, lanthanum trifluoromethanesulphonate, cobalt 2-ethylhexanoate, copper 2-ethylhexanoate, indium trifluoromethanesulphonate, gallium acetylacetonate, nickel acetylacetonate, lithium 2-ethylhexanoate, lithium trifluoromethanesulphonate, sodium 2-ethylhexanoate, sodium acetate, sodium trifluoromethanesulphonate, magnesium 2-ethylhexanoate, magnesium trifluoromethanesulphonate, calcium 2-ethylhexanoate, calcium trifluoromethanesulphonate, zinc 2-ethylhexanoate, zinc dithiocarbamate, zinc acetylacetonate, zinc tetramethylheptadionate, zinc salicylate, zinc chloride and other common zinc(II) compounds, bismuth 2-ethylhexanoate and bismuth acetate. Preferred catalysts are zinc and bismuth compounds; zinc 2-ethylhexanoate and bismuth 2-ethylhexanoate are more preferred.

Suitable polyhydroxyl compounds for this end use, and also further details relating to the preparation and application of baking varnishes of this kind, can be taken from the literature, for example from DE-A 19 738 497 or EP-A 0 159 117. More preferred applications for the products of the invention is their use as crosslinkers in the coil coating sector.

An overview of polyols which can be employed for the coil coat process is given in the table below. Polyesterpolyols, polycarbonatepolyols and polyacrylate-polyols can be used. In principle it is possible to employ any binder having a sufficiently high OH content.

| Trade name/brand | Type | Supply form |
|---|---|---|
| Alkynol 1665 SN/1B | oil-free, branched and saturated polyester | 65% SN100/IB |
| Alkynol VP LS 2013 | oil-free, branched polyester | 70% SN100 |
| Alkynol VP LS 2326 | oil-free, branched and saturated polyester | 60% SN100 |
| Desmophen 651 MPA | branched polyester | 67% MPA |
| Desmophen 670 | polyester with low degree of branching | solvent-free |
| Desmophen 690 MPA | branched polyester | 70% MPA |
| Desmophen 1200 | polyester with low degree of branching | solvent-free |
| Desmophen 1652 | oil-free, linear polyester | solvent-free |
| Desmophen C 200 | linear polycarbonate-polyester | solvent-free |

Using the polyisocyanates blocked in accordance with the invention, high-quality and elimination-product-free coatings having unusually low yellowing levels are obtained.

Besides the components mentioned, the binders of the invention may further comprise stabilizing additions, such as HALS amines or solvents, for example, and up to 5% by weight of an OH-functional hydrazide compound (based on the solids of the finished coating material). Further suitable additives include, for example, CAB (celluloase acetobutyrate) and also, for example, Acronal® 4 F (levelling agent and defoamer).

As a component for stabilizing against thermal yellowing it is possible to use the product, mentioned in EP-A 0 829 500, of the addition reaction of hydrazine hydrate with 2 mol of propylene carbonate, having the following formula:

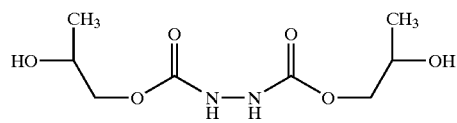

(molecular weight 236)
Starting Materials: Blocked Polyisocyanates
Preparation of Polyisocyanates Blocked with α-acidic Cyclic Ketones
Blocked Polyisocyanate A:

To a solution of 193.5 g (1 eq) of Desmodur® N3300 in solution in 14 g of methoxypropyl acetate (8 parts) and 29.9 g of xylene (17 parts) (70% strength solution in total) is added 0.17 g of zinc 2-ethylhexanoate (0.05% by weight) catalyst. The following reaction takes place under a nitrogen atmosphere. After the mixture has been stirred together homogeneously, 156.2 g (1 eq) of cyclopentanone 2-carboxyethyl ester (distilled) are carefully added dropwise. The reaction temperature should not rise above 40° C. during the addition. When addition of the ester is at an end, stirring is continued at 40° C. until the NCO value reaches zero (after about 6 hours). The blocked theoretical NCO content is 8.3%. The desired viscosity is then set using 7% of 2-butanol based on solids. In addition, 2.5% on solids (8.7 g) of Tinuvin® 770 DF (bis(2,2,6,6-etramethyl-4-piperidyl) sebacate) is added. The polyisocyanate used is an HDI polyisocyanate with isocyanurate structure, NCO content 21.8%, viscosity 3000 mPas (Desmodur® N 3300, Bayer AG, Leverkusen).

Blocked Polyisocyanate B:

3 eq (580.5 g) of Desmodur® N3300 and 1 eq (353 g) of Desmodur® Z4470 (an aliphatic polyisocyanate based on isophorone diisocyanate (IDPI) and dissolved Aromatic 100 and n-butyl acetate (2:1)) are dissolved under nitrogen in 415 g of xylene (70%-concentration mixture after reaction). To this mixture are added 1.45 g (0.1% by weight) of zinc 2-ethylhexanoate catalyst. After the mixture has been stirred together homogeneously, 4 eq (624.8 g) of cyclopentanone 2-carboxyethyl ester are carefully added dropwise. The reaction temperature should not rise above 40° C. during the addition. When addition of the ester is at an end, stirring is continued at 40° C. until the NCO value is near zero (about 12 h). The blocked NCO content is then 8.1%. After the end of the reaction, 101.7 g of 2-butanol and (7% based on BL 3175 (Bayer AG), crosslinking urethane baking resin based on hexamethylene diisocyanate, 75% strength solution in solvent naphtha 100, viscosity about 3300 mPas, NCO content (blocked) about 11.1%, blocking agent butanone oxime.

BL 3370 (Bayer AG), aliphatic crosslinking urethane baking resin, about 70% strength solution in 1-methoxypropyl 2-acetate (MPA), viscosity about 3500 1200 mPas, NCO content (blocked) about 8.9%, blocking agent diisopropyl amine.

Polyols Used: See Table Below.

Preparation of the Polyurethane Coating Materials of the Invention

The preparation of the coating materials of the invention is described after the preparation instructions for the blocked isocyanate component.

TABLE

Polyols used for the coil coating process

| Trade name/brand | Type | Supply form | Viscosity [mPa · s] | Acid number | OH fraction [%] | Equiv. Weight |
|---|---|---|---|---|---|---|
| Alkynol 1665 SN/IB | oil-free, branched and saturated polyester | 65% SN100/IB | 2700 ± 300 | ≦5.5 | about 1.7 | 1000 |
| Alkynol VP LS 2013 | oil-free, branched polyester | 70% SN100 | 4000 ± 200 | 5.0 ± 1.0 | about 2.0 | 850 |
| Alkynol VP LS 2326 | oil-free, branched and saturated polyester | 60% SN100 | about 1500 | about 2.2 | about 0.6 | 2830 |
| Desmophen 651 MPA | branched polyester | 67% MPA | 14 500 ± 3500 | ≦3.0 | 5.5 ± 0.4 | 309 |
| Desmophen 670 | polyester with low degree of branching | solvent-free | >200 000 | ≦2.5 | 4.3 ± 0.4 | 395 |
| Desmophen 690 MPA | branched polyester | 70% MPA | 10 000 ± 3500 | ≦6.0 | 1.4 ± 0.2 | 1214 |
| Desmophen 1200 | polyester with low degree of branching | solvent-free | 300 ± 100 (70% in MPA) | ≦4.0 | about 5.0 | 340 |
| Desmophen 1652 | oil-free, linear polyester | solvent-free | 11 000 ± 2000 | ≦4.0 | 1.6 ± 0.2 | 1063 |
| Desmophen C 200 | linear polycarbonate-polyester | solvent-free | 1050 ± 250 at 75° C. | ≦0.1 | 1.7 ± 0.2 | 1000 | solids) and 29 g (2% based on solids) of Tinuvin® 770 DF are added. The polyisocyanate used is a mixture of an HDI polyisocyanate with isocyanurate structure, NCO content 21.8%, viscosity 3000 mPas (Desmodur® N3300, Bayer AG, Leverkusen) and a polyisocyanate with isocyanurate structure based on IPDI (NCO content 11.9%, viscosity 2000 mPas, Desmodur® Z4470, Bayer AG, Leverkusen).

Blocked Polyisocyanate C:

0.9 eq (174.2 g) of Desmodur® N3300 and 0.1 eq (29 g) of Desmodur® W (bis (4-isocyanatocyclohexyl)methane) trimer are dissolved under nitrogen in 141.6 g of xylene (70%-concentration mixture after reaction). To this mixture is added 0.351 g (0.1% by weight) of zinc 2-ethylhexanoate catalyst. After the mixture has been stirred together homogeneously, 1 eq (156.2 g) of cyclopentanone 2-carboxyethyl ester are carefully added dropwise. The reaction temperature should not rise above 40° C. during the addition. When addition of the ester is at an end, stirring is continued at 40° C. until the NCO value is near zero (about 12 h). The blocked NCO content is then 8.16%. After the end of the reaction, 7 g (2% based on solids) of Tinuvin 770 DF are added. The polyisocyanate used is a mixture of an HDI polyisocyanate with isocyanurate structure, NCO content 21.8%, viscosity 3000 mPas (Desmodur® N3300, Bayer AG, Leverkusen) and a polyisocyanate with isocyanurate structure based on Desmodur W (13.5% Desmodur® N3300, degree of trimerization 20%, NCO content 14.5%, 65% solids (in solution in xylene/methoxypropyl acetate).

The blocking agent used, cyclopentanone 2-carboxyethyl ester, was obtained from the company Fluka.

Blocked Polyisocyanates Used for Comparison:

| 1K PU coil coating topcoat materials, white, polyol component Alkynol ® 1665 | | | | | |
|---|---|---|---|---|---|
| | 1 | 2 | 3 | 4 | 5 |
| Beadmill formulation (particle size <5 μm) | BL 3175 | BL 3370 | A | B | C |
| Alkynol 1665, 65% in solvent naphtha 100 | 9.8 | 9.8 | 9.8 | 9.8 | 9.8 |
| Isobutanol 31.5:3.5 Kronos 2160 | 29.3 | 29.3 | 29.3 | 29.3 | 29.3 |
| Solvesso 200 S (SN 200 S) | 7.8 | 7.8 | 7.8 | 7.8 | 7.8 |
| Make-up | | | | | |
| Alkynol 1665, 65% supply form | 21.5 | 20.0 | 19.3 | 19.1 | 19.2 |
| Desmodur BL 3175, 75% in solvent naphtha 100 | 11.9 | | | | |
| Desmodur BL 3370, 70% in 1-methoxypropyl 2-acetate | | 14.1 | | | |
| A, 70% in xylene/MPA 17:8 | | | 14.8 | | |
| B, 70% in xylene | | | | 15.0 | |
| C, 70% in xylene | | | | | 14.9 |
| Zinc 2-ethylhexanoate, 10% in SN 200 S | | | 0.7 | 0.7 | 0.7 |
| DBTL, 10% in SN 200 S (3) | 0.7 | 0.7 | | | |
| Acronal 4 F, 50% in SN 200 S (4) | 1.5 | 1.5 | 1.5 | 1.5 | 1.5 |

-continued

| | | | | | |
|---|---|---|---|---|---|
| CAB 531-1, !0% in SN 200 S/butyldiglycol 2:1 (5) | 7.3 | 7.3 | 7.3 | 7.3 | 7.3 |
| SN 200 S | | 10.3 | 9.6 | 9.6 | 9.6 | 9.6 |
| | | 100.0 | 100.0 | 100.0 | 100.0 | 100.0 |

| | Comparative examples | Inventive |
|---|---|---|
| Characteristic data | Binder | 29.3 |
| | Pigment | 29.3 |
| | Additives | 1.5 |
| | Solvent | 39.3 |
| | | 100.0 |
| | OH/NCO ratio | 1:1 |
| | Binder/pigment ratio | 1:1 |
| | Solids content (% by weight) | about 60 |
| | Diluent | Solvesso 200 S |
| | Application viscosity, DIN EN ISO 2431 with 5 mm nozzle/ 23° C. | about 100 s |
| | Baking conditions | PMT: see test results |

| | | % by weight |
|---|---|---|
| Additives (active substance calculated based on binder solids) | Catalyst addition | 0.2 |
| | Acronal ® 4F | 2.6 |
| | Cellulose acetobutyrate | 2.5 |

A = polyisocyanate
A, B = polyisocyanate
B, C = polyisocyanate C
Remarks (4 + 5) The combination of CAB and Acronal ® 4 F provides devolatilization and levelling.
Suppliers
(1) Kronos International INC, Leverkusen
(2) Deutsche Exxon, Cologne
(3) Brenntag, Mülheim/Ruhr
(4) BASF AG, Ludwigshafen
(5) Krahn Chemie, Hamburg Raw Materials Used Alkynol® 1665, oil-free saturated polyester based on isophthalic acid/adipic acid/NPG/propylglycol, Bayer AG, Leverkusen, OH content: 1.7% based on the 65% supply form in solvent naphtha 100/isobutanol 31.5:3.5

CAB (cellulose acetobutyrate) supplier: Krahn Chemie Hamburg, manufacturer: Eastman Kingsport USA; CAB 531-1 (about 53% butyryl content, hydroxyl content 1.7%—is not included in calculation)

Acronal® 4F Manufacturer BASF Ludwigshafen, polymer based on butyl acrylate (levelling agent and defoamer)

Solvesso® 200 S Manufacturer Esso/Exxon solvent aromatics content 99%, evaporation number (ether=1)~1000

Determination of the White Index

ASTM E 313, white index

Commercial Berger whiteness (without DIN)

Whiteness=Ry+3 (Rz−Rx)

The yellow index G to DIN 6167 is calculated using the following formula:

$$G = \frac{a \cdot x - b \cdot z}{y} \cdot 100$$

X, Y+Z=tristimulus values to DIN 5033 a = red/green axis*
b = blue/yellow axis**

*positive values ⇒ more red    negative ⇒ more green
**positive values ⇒ more yellow    negative ⇒ more blue Determination of the MEK Resistance Description of the method (in accordance with ECCA-T11 and also DIN EN ISO 2812-1 and DIN EN 12720):

The MEK wipe test is a quick test to check the final curing of the coating film. A cotton pad soaked with MEK is moved back and forth over the coating film with a constant pressure.

Instrument/accessories: balance (Bizerba brand), weights 100 g, 1 kg and 2 kg

Procedure:

For film thicknesses up to 20 µm use 1 kg counterpressure, above 20 µm 2 kg counterpressure.

The metal test panel is fastened to the weighing plate of the balance using film clips and anti-slip film. The balance is adjusted using the 100 g weight and the tare compensator. A cotton pad soaked with MEK is moved back and forth over the coating film against the selected test pressure until the coating film is destroyed.

Evaluation:

The number of double strokes performed up until the coating is destroyed is to be stated in the test report, a maximum of 100 double strokes being performed. After 100 double strokes have been reached (where appropriate), the film is assessed for alterations (dulling, softening).

Determination of the T-bend Test

In accordance with ECCA T 7. (ECCA: European Coil Coating Association) Description of the method:

Scope:

This method describes the determination of the resistance of an organic coating to cracking in the case of 180° bending.

Principle:

In this test the sample is bent for 1–2 s by 180° parallel to the direction of rolling, the coating being on the outside. There must be close contact between the metal sheets in order to ensure uniform bending. The smallest bending radius at which the sample can be bent without cracking determines the resistance in the case of 180° bending. The adhesion is tested using adhesive tape after each bending operation.

Apparatus:

The apparatus which can be used to carry out this method consists of a vise and a set of protective chucks.

Preparation:

The samples are stored at laboratory room temperature and laboratory air humidity for at least 24 h. The measurements are carried out under the same conditions.

If more precise conditions are prescribed or in the event of dispute, the details given in ISO 3270-1984 should be observed, namely 23±2° C. temperature and 50±5% relative humidity.

Method:

A sheet metal strip approximately 2 cm wide is cut against the rolling direction. This metal strip is bent by 180° parallel to the rolling direction for 1–2 seconds, with the coating on the outside. The metal is then compressed closely in the vise.

The bending edge is examined for cracks using a 20× magnifying glass. The adhesion is tested subsequently by pressing on and pulling off an adhesive tape three times.

The assessment of this 0 T bending is carried out using R for cracks and H for adhesion, with evaluation from 0–5, where 0 is the best score and 5 the worst score.

The metal is then bent around itself until a score of 0 is reached in cracking and adhesion.

The test is ended no later than at 3.0 T.

Subsequent Crack Resistance

The deformed T-bend strip is temperature-exposed at 100° C. for 30 minutes and then assessed again for cracks.

Paint Preparation:

Testing was carried out in the white coil coating topcoat material according to a standard formula (guideline formula RR 6830). For this purpose, a millbase was first prepared with the oil-free saturated polyester according to the following beadmill formulation:

| | |
|---|---|
| 9.8 parts | oil-free polyester Alkynol ® 1665, 65% supply form, |
| 7.8 parts | solvent Solvesso ® 200 S |
| 22.3 parts | white pigment Kronos 2330 |

The millbase was dispersed with 2 mm Siliquartz beads.
Dispersing was carried out for 1 hour on the Skandex ® mixer.
(Note:
The same formulation can be used in a beadmill and Skandex ® mixer (shaker machine). With the Skandex ® mixer there is the advantage that a plurality of samples are dispersed simultaneously and grinding takes place in a closed vessel. The subsequent removal of the beads by sieving takes place under a fume hood.)

The millbase is separated from the glass beads by sieving.

With stirring, the remaining components of the paint are added.

| | |
|---|---|
| 21.5 parts | oil-free polyester Alkynol ® 1665, 65% supply form, |
| 11.9 parts | blocked polyisocyanate*) |
| 0.7 part | DBTL, 10% in Solvesso ® 200 S, |
| 7.3 parts | cellulose acetobutyrate CAB 531-1, 10% in Solvesso ® 200 S/butyldiglycol 2:1 |
| 1.5 parts | Acrynol ® 4 F, 50% in Solvesso ® 200 S |
| X parts | Solvesso ® 200 S (10.3 parts when using BL 3175 as blocked polyisocyanate) |

*)The amount of blocked PIC added changes depending on the equivalent weight of the PIC (in this case Desmodur ® BL 3175 - as comparison). Polyol and blocked polyisocyanate are combined equivalently, i.e. if fewer blocked NCO groups are available the proportion of the blocked PIC must be increased. The equivalent weights are indicated in the data sheet.

Adjustment of the paint to the processing viscosity of about 70 sec DIN 4/23° C. is made using Solvesso® 200 S.

The paint was applied to chromated aluminium panels (1 mm thick) by knifecoating.

Immediately after paint application, the panels were baked on the rotating plate in the Aalborg oven.

| | |
|---|---|
| PMT 210° C. | 30 sec at 350° C. oven temperature |
| PMT 216° C. | 33 sec at 350° C. oven temperature |
| PMT 224° C. | 35 sec at 350° C. oven temperature |
| PMT 232° C. | 38 sec at 350° C. oven temperature |
| PMT >254° C. | 50 sec at 350° C. oven temperature |

The dry film thickness is 20–22 μm.

| | Coil coating paints | | | | |
|---|---|---|---|---|---|
| Blocked polyisocyanate investigated | BL 3175 | Ex. A | Ex. B | Ex. C | BL 3370 |
| Film thickness [μm] ECCA-T1(*1) | 20–22 | 20–22 | 20–22 | 20–22 | 20–22 |
| Whiteness Wb = Ry + 3(Rz−Rx) (Berger) | 92.3 | 91.6 | 92.2 | 91.4 | 91.6 |
| Yellow index | −3.1 | −2.4 | −2.6 | −2.5 | −2.8 |
| Gloss according to Gardner 60° ECCA-T2 (1*) | 76 | 67 | 68 | 65 | 69 |
| MEK wipe test (PMT 196° C.)/whiteness | — | — | — | — | 95X/92.4 |
| MEK wipe test (PMT 199° C.)/whiteness | 10X/94.1 | 100X/94.6 | 65X/94.0 | 100M/93.9 | 100X/92.4 |
| MEK wipe test (PMT 204° C.)/whiteness | 95X/93.6 | 100X/94.6 | 100M/94.3 | 100X/94.4 | 100X/92.5 |
| MEK wipe test (PMT 210° C.)/whiteness | 100X/93.6 | 100X/94.2 | 100X/94.0 | 100X/94.1 | 100X/92.4 |
| MEK wipe test (PMT 216° C.)/whiteness | 100X/93.3 | 100X/93.8 | 100X/94.0 | 100X/94.2 | 100X/92.0 |
| MEK wipe test (PMT 224° C.)/whiteness | 100X/93.1 | 100X/93.0 | 100X/92.9 | 100X/93.2 | 100X/91.8 |
| MEK wipe test (PMT 232° C.) | 100X | 100X | 100X | 100X | 100X |
| Microhardness HU corr. (N/mm2) φ of 3 measurements | 128.7 | 55.1 | 99.8 | 86.0 | 140.7 |
| Impact test [inch/lbs] ECCA-T5 (*1) | 80 | 80 | 80 | 80 | 80 |
| Adhesion 6 mm Erichsen cupping in cross-hatch ECCA-T6 (*1) | 0 | 0–1 | 0 | 0 | 0 |
| T-bend test T0.0 R = cracks T0.5 H = adhesion T1.0 0 = best score T1.5 5 = worst score T2.0 | R5 H1 R1 H0 R0 | R5 H1 R1 H0 R0 | R5 H1 R2 H0 R0 | R5 H1 R2 H0 R0 | R5 H1 R1 H0 R0 |
| Subsequent cracking test 30 min. 100° C. | T1.5+ T1.0− | T1.5+ T1.0− | T1.5+ T1.0+ | T1.5+ T1.0+ | T1.5+ T1.0− |

Binder: Alkynol 1665
Binder ratio: equivalent
Pigment: titanium dioxide Kronos 2330
Binder-pigment ratio: 1:1
Catalyst: 0.2% (calculated on basis of binder solids)
Baking conditions: 232° C. (PMT)
Dumbbell: 42
Substrate: Al panel pretreated with Bonder 722
(*1): in modification, since measurement not carried out in climatized area -continued

| Coil coating paints | | | | | |
|---|---|---|---|---|---|
| Blocked polyisocyanate investigated | BL 3175 | Ex. A | Ex. B | Ex. C | BL 3370 |

− = subsequent cracking;
+ = no subsequent cracking

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Organic polyisocyanates having at least two isocyanate groups, wherein isocyanate groups have been blocked with CH-acidic cyclic ketones of the general formula (I)

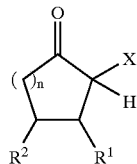

(I)

in which

X represents an electron-withdrawing group, $R^1$ and $R^2$ independently of one another represent the radicals H, $C_1$–$C_{20}$-(cyclo)alkyl, $C_6$–$C_{24}$-aryl, $C_1$–$C_{20}$-(cyclo)alkyl ester or $C_1$–$C_{20}$-(cyclo)alkyl amide, $C_6$–$C_{24}$-aryl ester or $C_6$–$C_{24}$-aryl amide, mixed aliphatic/aromatic radicals having 1 to 24 carbon atoms, wherein $R^1$ and $R^2$ may also be part of a 4 to 8-membered ring, n is an integer from 0 to 5, and wherein the organic polyisocyanates have an overall blocked isocyanate group content (calculated as NCO) of from 25 to 0.1% by weight.

2. Organic polyisocyanates according to claim 1, wherein the electron-withdrawing group X is selected from the group consisting of ester-amide, sulphoxide, sulphone, nitro, phosphonate, nitrile, isonitrile, polyhaloalkyl, halogen and carbonyl groups.

3. Organic polyisocyanates according to claim 1, wherein CH-acidic cyclic ketones of the general formula (I) are one of cyclopentanone 2-carboxymethyl ester, cyclopentanone 2-carboxyethyl ester, cyclopentanone-2-carbonitrile, cyclohexanone 2-carboxymethyl ester, cyclohexanone 2-carboxyethyl ester and cyclopentanone-2-carbonylmethyl.

4. Organic polyisocyanates according to claim 1, wherein CH-acidic cyclic ketones of the general formula (I) are one of cyclopentanone 2-carboxymethyl ester, cyclopentanone 2-carboxyethyl ester, cyclohexanone 2-carboxymethyl ester and cyclohexanone 2-carboxyethyl ester.

5. Process for preparing organic polyisocyanates according to claim 1, wherein polyisocyanates are reacted with CH-acidic cyclic ketones of the general formula (I)

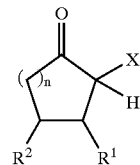

(I)

in which

X represents an electron-withdrawing group, $R^1$ and $R^2$ independently of one another represent the radicals H, $C_1$–$C_{20}$-(cyclo)alkyl, $C_6$–$C_{24}$-aryl, $C_1$–$C_{20}$-(cyclo)alkyl ester or $C_1$–$C_{20}$-(cyclo)alkyl amide, $C_6$–$C_{24}$-aryl ester or $C_6$–$C_{24}$-aryl amide, mixed aliphatic/aromatic radicals having 1 to 24 carbon atoms, wherein $R^1$ and $R^2$ may also be part of a 4 to 8-membered ring, n is an integer from 0 to 5, in the presence of a catalyst, using from 0.8 to 1.2 mol of the cyclic ketone of the formula (I) per isocyanate group equivalent of the polyisocyanates for blocking.

6. Process according to claim 5, wherein the organic polyisocyanate contains one of a uretdione, isocyanurate, iminooxadiazinedione, acylurea, biuret and allophanate structure.

7. Process according to claim 5, wherein one of alkali metal bases, alkaline earth metal bases, zinc salts and other Lewis acids are used as catalysts.

8. A method for preparing PU coating materials, comprising adding organic polyisocyanates according to claim 1 to a formulation.

9. Method according to claim 8, wherein the PU coating materials one-component (1 K) PU baking varnishes.

10. PU coating materials comprising organic polyisocyanates according to claim 1.

11. Method for coating coils, comprising applying coating materials according to claim 9 to the coils.

* * * * *